US011377031B1

(12) United States Patent
Martinez (10) Patent No.: US 11,377,031 B1
(45) Date of Patent: Jul. 5, 2022

(54) AUTOMOBILE SIDE VIEW MIRROR APPARATUS AND SYSTEM

(71) Applicant: Joshua Martinez, Fresno, CA (US)

(72) Inventor: Joshua Martinez, Fresno, CA (US)

( * ) Notice: Subject to any disclaimer, the term of this patent is extended or adjusted under 35 U.S.C. 154(b) by 0 days.

(21) Appl. No.: 17/169,497

(22) Filed: Feb. 7, 2021

(51) Int. Cl.
*B60R 1/00* (2022.01)
(52) U.S. Cl.
CPC .................................. *B60R 1/007* (2013.01)
(58) Field of Classification Search
CPC .............. B60R 1/007; B60R 1/06; B60R 1/08
USPC ............................. 359/855; 296/1.11, 180.1
See application file for complete search history.

(56) References Cited

U.S. PATENT DOCUMENTS

| 1,567,169 | A | * | 12/1925 | Patterson | B60R 1/04 296/200 |
| 4,815,689 | A | * | 3/1989 | Schiff | B60R 1/082 248/481 |
| 4,923,241 | A | * | 5/1990 | Miller | B60J 1/20 454/131 |
| 5,150,941 | A | * | 9/1992 | Silzer | B60J 1/2002 296/180.1 |
| 5,235,469 | A | * | 8/1993 | Horian | G02B 5/08 359/872 |
| 6,273,576 | B2 | * | 8/2001 | Galicia | B60R 1/06 359/872 |
| 6,758,510 | B1 | * | 7/2004 | Starling | B60R 1/04 296/193.06 |
| 7,167,294 | B2 | | 1/2007 | Lynam et al. | |
| 8,998,290 | B2 | * | 4/2015 | Serentill | B60J 3/005 296/152 |
| 2007/0153406 | A1 | * | 7/2007 | Matsumoto | B60R 1/082 359/865 |

FOREIGN PATENT DOCUMENTS

DE 19522900 A1 * 5/1996

* cited by examiner

*Primary Examiner* — Ricky D Shafer
(74) *Attorney, Agent, or Firm* — Richard A. Ryan (57) ABSTRACT

A side view mirror apparatus for improving a driver's view of the area alongside and behind him or her while in the driver's seat of an automobile. The mirror apparatus has a frame with a side section that extends along a window post of the automobile and an upper section that extends along a window frame of the automobile. The mirror frame fits between the window and the window post and window frame. The mirror apparatus has a housing in the side section that defines an interior chamber. Multiple reflectors are movably mounted in the interior chamber to provide full view of the area on the side of the vehicle where the mirror apparatus is mounted. The side section mounts to an existing mounting position and the lowermost deflector is connected to the automobile's mirror control system. The system includes the mirror apparatus and relevant components of the automobile.

20 Claims, 4 Drawing Sheets

AUTOMOBILE SIDE VIEW MIRROR APPARATUS AND SYSTEM

CROSS-REFERENCE TO RELATED APPLICATIONS

None.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to apparatuses and systems that are utilized with an automobile to improve the functionality and safety of the automobile. In particular, the present invention relates to such apparatuses and systems that are specially configured to improve the driver's visibility while he or she is operating the automobile. Even more particularly, the present invention relates to such apparatuses and systems that are specially configured to be utilized at an exterior side of an automobile to improve the driver's view along the side of the automobile and, therefore, assist the driver avoid side collisions or to assist the driver with backing up the automobile.

B. Background

Motor vehicles are utilized throughout the world by many people and for many different purposes. Although there are many different types of motor vehicles, a common configuration for a motor vehicle is as a car or truck that is operated by a driver who sits inside the motor vehicle behind a steering wheel that allows the driver to operate the motor vehicle to move from one location to another. For purposes of the present invention, such cars and trucks are referred to herein as an "automobile" so as to distinguish themselves from motorcycles, airplanes, ships and other motor or motorized vehicles. Automobiles have a vehicle body that define the front, back, sides and interior of the automobile, a motor that provides power, a drive system that converts power from the motor to wheels, typically four wheels, that allow the automobile to move across a surface. Inside the interior of an automobile are seats for the passengers, including a driver's seat for the driver, the steering wheel and power/braking components that are operated by the driver to move or stop the automobile. A variety of safety devices are associated with the automobile to help the driver safely operate the automobile as he or she moves or stops the automobile and to help protect the driver and the passengers in the automobile in case of a collision with another object, which may be an automobile or type of motor vehicle.

One set of such safety devices are mirrors. Specifically, automobiles are typically equipped with at least an interior rearview mirror assembly and at least one exterior side view mirror assembly. The interior rearview mirror is typically at or near the upper center of the automobile's front window and is configured to provide the driver with a rearward field of view that is, at least generally, directly rearward of the automobile, such as along the road lane in which the automobile is traveling. Conventionally, automobiles are equipped with two side view mirror assemblies, one being a driver-side exterior side view mirror assembly mounted on the exterior of the automobile slightly forward of the driver and the other being a passenger-side exterior side view mirror assembly that is mounted to the side of the automobile body opposite to that of the driver-side mirror assembly. Both of the exterior side view mirror assemblies typically comprise a reflective element, such as a mirror, that is adapted to provide a rearward field of view of the area adjacent the side of the automobile associated with the assembly, namely either the driver side or passenger side of the automobile. Side view mirror assemblies are configured and positioned to allow the driver of the automobile to see whether a motor vehicle is approaching the area adjacent the driver's automobile when he or she is contemplating moving into the adjacent area, such as when the driver is making a lane change to a driving lane adjacent the lane in which the automobile is traveling. The two side view mirror assemblies, as well as the rearview mirror, also assist the driver with backing up the automobile.

While the combination of an interior rearview mirror with driver-side and passenger-side exterior mirrors generally work well in many driving situations, it is well known by persons who are skilled in the relevant art that rear vision blind spots exist and present a potential safety hazard while driving. For purposes of describing the present invention, a rear vision blind spot is an area that is generally adjacent the side of an automobile where a view of another vehicle, which may be overtaking the automobile on that side, is not able to be seen in the rearward field of view of the exterior mirror on that side of the automobile. This rear vision blind spot presents a potential safety hazard as the driver, upon checking the view in the exterior side view mirror and failing to see the overtaking vehicle, may consider it safe to initiate a lane change because he or she is unaware that there is a motor vehicle immediately adjacent his or her automobile in the area of the blind spot.

Various attempts have been made conventionally to minimize and/or eliminate exterior mirror blind spots on automobile side view mirrors. One approach is to make the exterior mirror reflector larger, and particularly wider with respect to the body of the automobile. By increasing the width of the reflector portion of the exterior mirror, the mirror has a wider field of view rearward and outward and, as a result, reduces the reflector blind-spot. While use of a wide exterior mirror reflector is an option for larger sized automobiles, including many trucks, buses and larger commercial vehicles, increasing the width of the reflector used in an exterior side view mirror assembly mounted on a standard automobile (such as sedans, station wagons, sports cars, convertibles, minivans, sports utility vehicles, pick-up trucks and similar passenger carrying automobiles) is often not a practical option. In such standard automobiles, increasing the width of the exterior mirror reflector increases the size of the exterior side view mirror assembly results in an increase in difficulty parking the automobile (particularly in tight parking spaces), an decrease in fuel efficiency due to an increase in aerodynamic drag, increase in fuel consumption, increased difficulty in parking in tight parking spaces and, often, an increase in mirror assembly vibration. Use of a non-flat, curved exterior mirror reflector, which may be attached onto the reflector of a side view mirror, is commonly utilized to increase the rearward and outward field of view of the side view mirror without an increase in reflector size.

While working well to increase field of view, use of a curved reflector (such as a convex, spherically-curved reflector) has certain known disadvantages. For instance, although the field of view rearward and outward increases as the degree of curvature of the bent surface increases, such wide-angle mirrors have non-unitary magnification and distance perception rearward is often distorted. For this reason, convex (spherically-bent) exterior mirror reflectors are required in some countries, including the United States, to carry a safety warning that the objects in the mirror are closer than they may appear to the driver. As will be readily appreciated by persons who are skilled in the relevant art, distance perception is particularly important for a driver-side exterior mirror. In light of this, federal laws require the driver-side exterior mirror reflector be able to exhibit unit magnification, and place certain restrictions on the radius of curvature that is allowed for curved passenger-side mirrors (as well as requiring a safety warning be placed thereon). To address such issues, spherically bent/convex mirror reflectors, aspherical or multi-radius mirror reflectors have been developed. Such mirrors, which are widely used in Europe and Asia for both driver-side and passenger-side exterior mirror reflectors, typically have a less curved reflective region that is inboard or closest to the driver when mounted on a vehicle and, have a more curved region (commonly separated by a demarcation line or the like) that is outboard or farthest from the driver when mounted on a vehicle. However, such aspherical or multi-radius reflectors do not have unitary magnification.

Some people a small-sized auxiliary and separate curved reflector with the driver-side exterior side view mirror assembly to supplement a flat driver-side exterior mirror reflector. However, use of an auxiliary mirror is often not suitable for passenger automobiles due to the extra space that is required for placement of the auxiliary mirror on the reflector of the side view mirror assembly. Also, because the position of the side view mirror reflector is usually adjustable by the driver, such as by a being hand-adjustable from the outside the automobile or manually adjustable from the interior of the automobile, including by an electrically operable actuator, in order to provide a driver his or her desired rearward field of view, the arrangement of the side view mirror often prevents use of a separate, auxiliary reflector. It is also somewhat common, at least in the United States for larger-sized mirrors, to utilize a stick-on blind-spot mirror reflectors on the surface of the reflector of an automobile exterior side view mirror. Because such add-on reflectors are placed on the surface of the reflector, they have the known disadvantage of obscuring a portion of the field of view of the side view mirror.

What is needed, therefore, is an improved exterior side view mirror apparatus and system for automobiles that overcomes the various disadvantages of presently available side view mirror systems with regard to allowing the driver of an automobile to view rearward and outward from the mirror. More specifically, what is needed is a new and improved side view mirror apparatus and system for automobiles that allows the driver of an automobile to better see what is alongside his or her automobile in a manner which reduces or eliminates the rear vision blind spot that can cause a collision with another motor vehicle or object when the driver moves the vehicle in the direction of that side, such as when changing from one driving lane to another lane. The new side view mirror apparatus and system of the present invention should be adaptable to a wide range of different types of automobiles, including those having hand-adjustable or electrically-adjustable side view mirror systems. In addition, the new side view mirror apparatus and system should be able to provide the driver with a distortion-free field of view with unitary magnification. The new side view mirror apparatus and system should be easy to utilize and effective at improving the safety of the driver and passengers in the automobile having the new side view mirror apparatus. Preferably, the new side view mirror apparatus and system should be relatively inexpensive to manufacture so as to be widely available for use.

SUMMARY OF THE INVENTION

The following presents a simplified summary of the disclosure of the present invention in order to provide a basic understanding of the invention to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later.

The use of terms such as "including", "comprising" or "having" and variations thereof herein is meant to encompass the items listed thereafter and equivalents thereof. The terms "a" and "an" herein do not denote a limitation of quantity, but rather denote the presence of at least one of the referenced items. Further, the use of terms "first", "second", and "third", and the like, herein do not denote any order, quantity, or importance, but rather are used to distinguish one element or feature of an element from another. The term "and/or," when used herein with a list of two or more items, means that any one of the listed items can be employed by itself, or any combination of two or more of the listed items can be employed.

The side view mirror apparatus and system of the present invention provides the benefits and solves the problems identified above. That is to say, the present invention is directed to a new and improved side view mirror apparatus and system that are configured for use with an automobile to allow the driver of the automobile to better see the areas that are rearward and outward from his or her automobile. More specifically, the new side view mirror apparatus and system for automobiles of the present invention allows the driver of an automobile to better see what is alongside and/or approaching his or her automobile in order to reduce or even eliminate the rear vision blind spot that can cause a collision with another motor vehicle or object when the driver moves the vehicle in the direction of that side, such as when changing from one driving lane to another lane. The new side view mirror apparatus and system of the present invention is readily adaptable to a wide range of different types of automobiles, including automobiles that have hand-adjustable or electrically-adjustable side view mirror systems. In addition, the new side view mirror apparatus and system provides the driver with a distortion-free field of view with unitary magnification and will eliminate the need for an auxiliary mirror or an add-on reflector. In the preferred embodiments, the new side view mirror apparatus and system is easy to utilize and effective providing an increase in the driver's awareness of motor vehicles and objects that are alongside or which are approaching his or her automobile. As such, use of the new side view mirror apparatus and system on an automobile will make the driver and passengers of the automobile safer. In certain of the preferred embodiments, the new side view mirror apparatus and system is relatively inexpensive to manufacture so as to be widely available for use with automobiles.

In one of the preferred embodiments of the present invention, the new side view mirror apparatus is configured for use with an automobile having a side window that received in a channel which extends along a generally vertically disposed window post and a generally horizontally disposed window frame of the automobile. The mirror apparatus generally comprises a mirror frame, a window channel which extends along the mirror frame, a housing defined by the mirror frame and a plurality of reflectors in the housing that are cooperatively angled so they will provide the driver of the automobile with a good view of any adjacent and approaching objects, including motor vehicles. The mirror frame has a side section and an upper section that is attached to or integral with the side section. The side section of the mirror frame has a forward edge that is sized and configured to be received in the channel in the window post and the upper section has a top edge which is sized and configured to be received in the channel in the window frame. The window channel extends along the side section and the upper section of the mirror frame, with the window channel of the side section sized and configured to receive a forward edge of the side window and the window channel of the upper section sized and configured to receive an upper edge of the side window. The side section has a housing which has a forward end, an outer side, an inner side and a rearward end that define an interior chamber in the housing. Typically, the plurality of reflectors comprises a first reflector that is positioned toward a lower end of the side section, a second reflector which is positioned above the first reflector and a third reflector that is positioned above the second reflector. Each of the reflectors are independently movably disposed in the interior chamber so as to allow the driver or another person to make adjustments to the deflectors in order to improve the ability of the driver of the automobile to see any objects, including other vehicles, in or approaching the driver side view or passenger side view of the automobile. Each of the first reflector, the second reflector and the third reflector are separately secured to the interior chamber with a mirror mounting mechanism. Each mirror mounting mechanism is structured and arranged to allow one of the associated reflector to pivot relative to the housing. In one embodiment, at least one of first reflector, the second reflector and the third reflector are operatively connected to a mirror control system of the automobile to allow the driver to easily adjust the angles of the reflectors. In a preferred configuration, the side section of the mirror frame is connected a mounting position associated with the automobile that was used to mount the side mirror which the new mirror apparatus replaced. Typically, the first reflector is larger than the second reflector and the second reflector is larger than the third reflector.

Accordingly, the primary object of the present invention is to provide a new side view mirror apparatus and system that has the advantages which are set forth above and that overcomes the various disadvantages and limitations which are associated with presently available side view mirrors.

It is an important object of the present invention to provide a new side view mirror apparatus and system that are specifically structured and arranged to be utilized with an automobile to improve the ability of the driver of the automobile to see to the sides of the automobile so he or she will know if another motor vehicle is alongside or approaching his or her automobile prior to changing driving lanes or otherwise moving to an area that could result in a collision with the other motor vehicle.

It is also an important object of the present invention to provide a new side view mirror apparatus and system that are specifically structured and arranged to be utilized with an automobile in order to improve the ability of the driver of the automobile to see to the sides of the automobile to avoid a collision with another motor vehicle or object when he or she is backing up the automobile.

An important aspect of the present invention is that it provides a new side view mirror apparatus ands system that accomplishes the objectives set forth above and elsewhere in the present disclosure.

Another important aspect of the present invention is that it provides a new side view mirror apparatus and system which are specifically structured and arranged to be utilized with an automobile to improve driver's visibility rearward and outward from the automobile so as to make the automobile safer to operate and, therefore, reduce the likelihood of harm and/or damage that could result from a collision with another motor vehicle or an object.

Another important aspect of the present invention is that it provides a new side view mirror apparatus and system that are specifically structured and arranged to be utilized with an automobile to improve the ability of the driver of the automobile to see a motor vehicle or other object when he or she is backing up the automobile in order to avoid a collision with the motor vehicle or object.

Another important aspect of the present invention is that it provides a new side view mirror apparatus and system that are adaptable for use with a wide range of automobiles, including those automobiles which have a hand-operated or motor-driven side view mirror system.

Another important aspect of the present invention is that it provides a new side view mirror apparatus and system which can be installed on the window frame of an automobile to provide multiple side view reflectors that are pivotally or otherwise adjustably mounted onto an externally positioned wind deflector and/or sun visor in a manner that allows the driver of the automobile to better see to the side and behind him or her so as to avoid collisions with another motor vehicle alongside or approaching his or her automobile.

Yet another important aspect of the present invention is that it provides a new side view mirror apparatus and system which, in a preferred configuration, are easy to use and which are relatively inexpensive to manufacture.

As will be explained in greater detail by reference to the attached figures and the description of the preferred embodiments which follow, the above and other objects and aspects are accomplished or provided by the present invention. As set forth herein and will be readily appreciated by persons who are skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular configurations for the side view mirror apparatus and system of the present invention, persons who are skilled in the relevant art will readily appreciate that the present invention is not so limited. In addition, the exemplary embodiments of the present device are shown and described with only those components which are required to disclose the present invention. Many of the necessary components for manufacturing and using the present invention are not shown in the drawings or necessarily described below, but which are well known to persons skilled in the relevant art. As will be readily appreciated by such persons, the various elements of the present invention that are described below may take on any form consistent with forms which are readily realized by one of ordinary skill in the art having knowledge of prior art side view mirrors and systems and the automobiles with which such apparatuses and systems are utilized.

Figure 1:
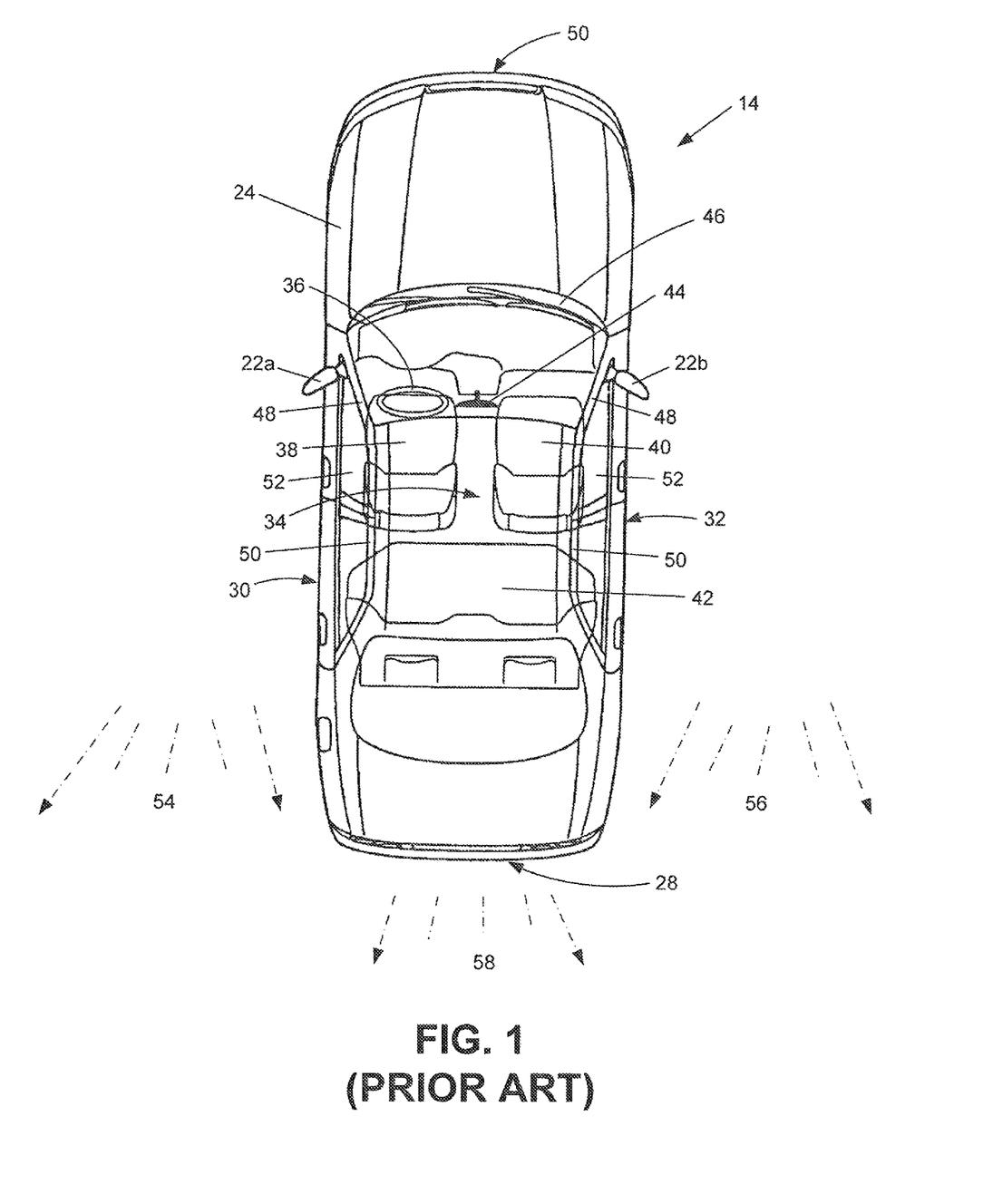
FIG. 1 is top view of a prior art automobile that is shown with the roof thereof being transparent to show the components of the automobile which are relevant to the present invention.
Figure 3:
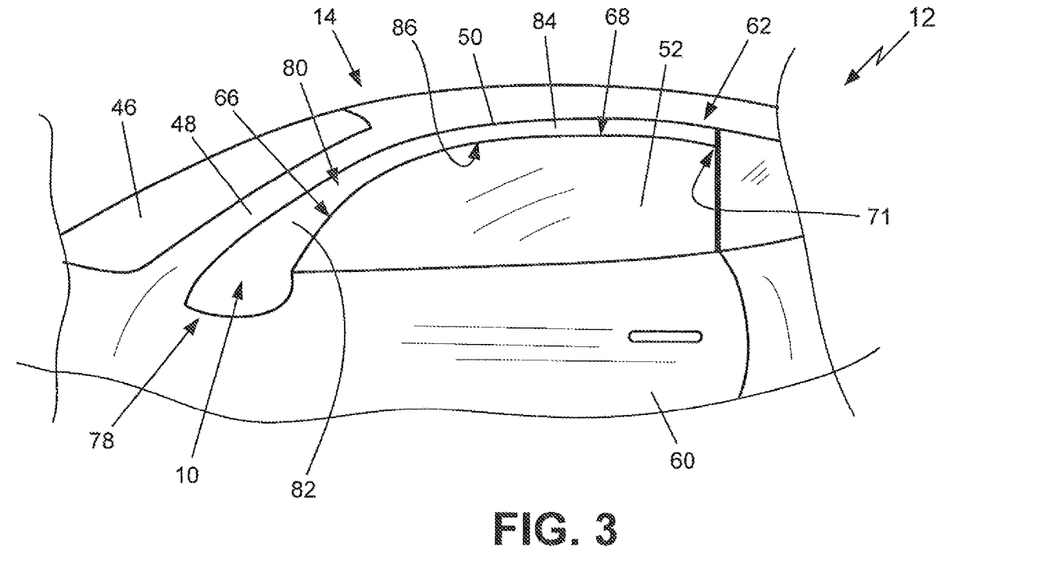
FIG. 3 is a side view of the prior art automobile of FIG. 2 shown with a vehicle side mirror apparatus that is configured according to one of the preferred embodiments and mounted at the prior art mounting position and placed between the side window and the window post and side window frame of the automobile.
Figure 4:
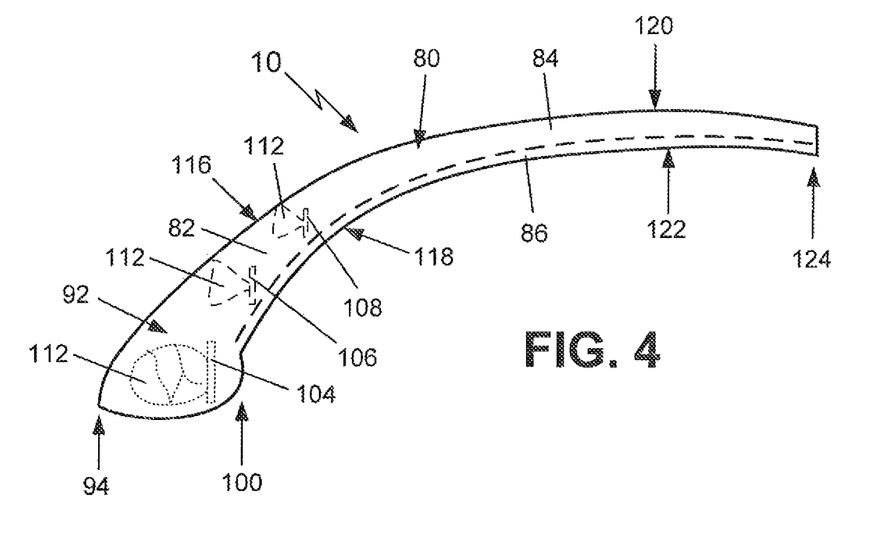
FIG. 4 is a side view of the vehicle side mirror apparatus of FIG. 3.
Figure 5:
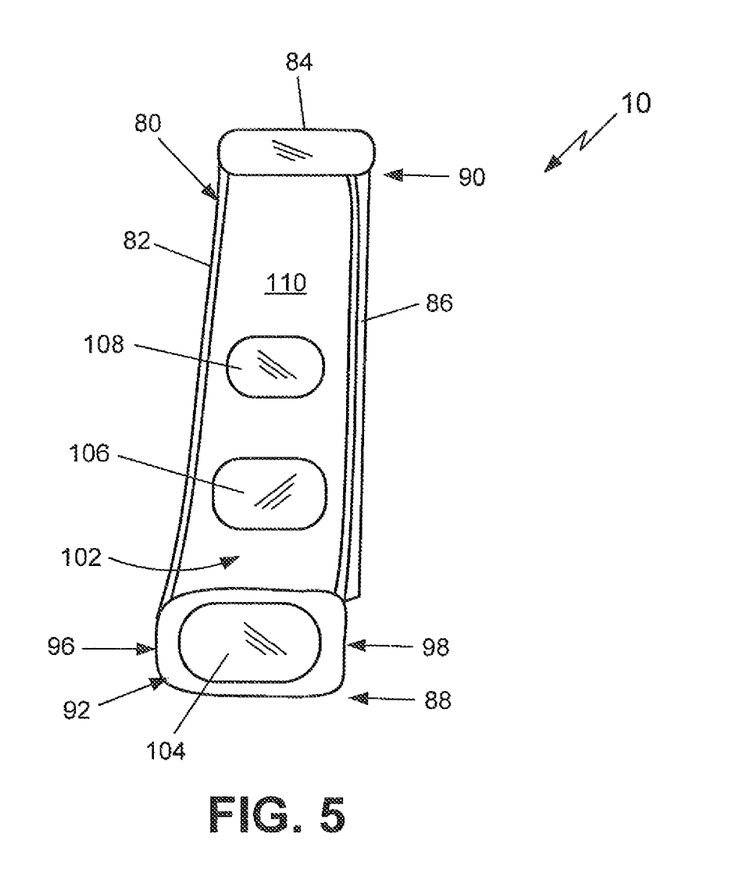
FIG. 5 is a rear view of the vehicle side mirror apparatus of FIG. 4.

A new side view mirror apparatus that is configured pursuant to one or more of the preferred embodiments of the present invention is shown generally as 10 in FIGS. 3-5. A side view mirror system that is configured pursuant to the preferred embodiments of the present invention and which utilizes the new side view mirror apparatus 10 is shown as 12 in FIGS. 3 and 6. As shown in these figures and set forth in more detail below, the new side view mirror apparatus 10 and system 12 of the present invention are structured and arranged to be utilized with an automobile 14, an example of which is shown in FIG. 1, to improve the view of the driver 16 of the automobile 14 with regard to seeing behind and to the sides of the automobile 14. As set forth in more detail below and summarized in FIG. 6, the new side view mirror apparatus 10 and system 12 allow the driver 16 to better see rearward and outward from the automobile 14 that he or she is driving to allow the driver 16 to be more visually aware of what is alongside and/or approaching the automobile 14 in order to reduce or even eliminate the rear vision blind spot 18 that can cause a collision with another object 20, such as a motor vehicle or the like, when the driver 16 moves his or her automobile 14 in the direction of that side, such as when changing from one driving lane to another lane. In the preferred embodiments of the present invention, the new side view mirror apparatus 10 and system 12 is easy to use and effective at increasing the driver's awareness of any objects 20 that are alongside or which are approaching the automobile 14.

The new side view mirror apparatus 10 and system 12 of the present invention is readily adaptable to a wide range of different types of automobiles 14, including automobiles 14 having hand-adjustable or electrically-adjustable prior art side view mirrors 22, such as shown with regard to the automobile 14 of FIG. 1. The automobile 14 shown in FIG. 1 is shown for exemplary purposes to describe the components of the automobile 14 that are or may be relevant to the present invention. As such, the new side view mirror apparatus 10 and system 12 of the present invention is not limited to the type of automobile 14 shown in FIG. 1. In fact, as will be readily appreciated by persons who are skilled in the relevant art, the new apparatus 10 and system 12 are likely to be readily adaptable to a wide range of different types of automobiles 14, including but not limited to standard passenger cars and trucks, commercial trucks and recreational vehicles. A typical automobile 14 has an automobile body 24 that defines a front end 26, back end 28, first or left side 30 and a second or right side 32 and which encloses an automobile interior 34. Each of the first/left side 30 and the second/right side 32 of the body 24 has a prior art side mirror 22 mounted or otherwise associated therewith (shown respectively as 22a and 22b in FIG. 1). The interior 34 of the automobile 14 has a steering wheel 36 which the driver 16 holds onto and uses to control the movement of the automobile 14, a driver's seat 38, a passenger seat 40 and, typically, one or more rear seats 42 and a rearview mirror 44. The rearview mirror 44 is mounted to or near the upper middle position of a front windshield 46. Each side 28/30 of the body 24 has a upwardly and, generally, rearwardly extending front window post 48 that connects to or is integral with a side window frame 50, which extends rearward from the front window post 48, that supports a side window 52 at each side 28/20 of the automobile 14. For purposes of describing the use of the apparatus 10 and system 12 of the present invention, the direction of the first/left side 30 of the body 24 is also referred to as the "driver's side" and the second/right side 32 of the body 24 is also referred to as the "passenger side" to correspond to the location of the driver's seat 38 and passenger seat 40. Likewise, the view to the left and rearward from the automobile 14 is referred to as the driver side view 54 and the view to the right and rearward from the automobile 14 is referred to as the passenger side view 56. What the driver 16 can see when he or she is looking through the one of the side mirrors 22 is referred to as the viewing position 57. The view directly rearward of the back end 28 of the body 24 of the automobile 14, which is seen by the driver 16 when he or she is in the driver's seat 38 and looking into the rearview mirror 44, is referred to as the "rear view" 58.

For purposes of describing the use and relative location of the various components of the new apparatus 10 and system 12 of the present invention with regard to the use thereof with the automobile 14, the terms "front", "forward", "forwardly" and the like are utilized to refer to the direction of the front end 26 of the body 24 as seen by the driver 16 when he or she looks through the front windshield 46 and the terms "back", "rearward", "rearwardly" and the like are utilized to refer to the direction of the back end 28 as seen by the driver 16 when he or she is looking into the rearview mirror 44. The directions "left", "leftward", "right", "rightward" and the like refer to a direction to the left or right when viewed from the perspective of the reader in FIG. 1 and, as set forth above, are utilized in reference to the driver side view 54 and passenger side view 56. Likewise, the various terms "upward", "upwardly", "upper", "top" and the terms "downward", "downwardly", "lower", "bottom" and the like refer to the direction, respectively, to or toward the top of the automobile 14 and to or toward the road or other surface on which the automobile moves.

Figure 2:
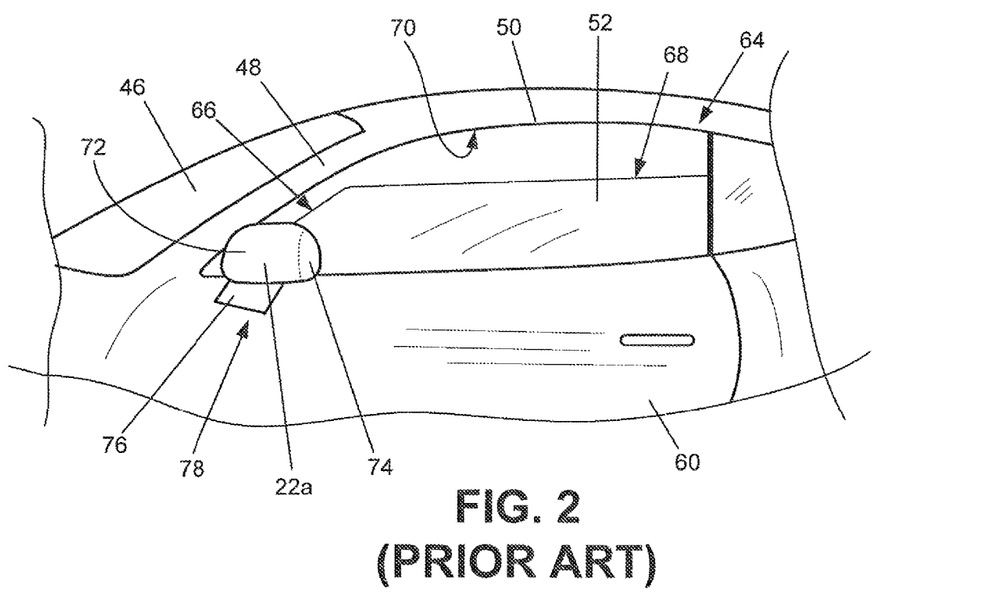
FIG. 2 is a side view of the prior art automobile of FIG. 1 showing the side window thereof is in its lowered position to better illustrate the components of thereof.

As shown in FIG. 2, a prior art automobile 14 has side windows 52 that are each, independently, connected to a window system (not shown) that is inside a side door 60 which is structured and arranged to allow the side window 52 to be controllably moved up and down relative to the side door 60 that is associated with the side window 52. Each side window system of an automobile 14 allows a driver 16 or one of the passengers to move a side window 52 between a raised position 62 (FIG. 3) and a lowered position 64 (FIG. 2), which as shown in FIG. 2 may be partially lowered. As shown in FIG. 2, the side window 52 has a forward edge 66 and an upper edge 68 that, when the side window 52 is in its raised position 62, are respectively received in a window channel 70 that is positioned, contiguously, along the window post 48 and side window frame 50 to secure the side window 52 in place in its raised position 62. In the raised position 62, the distal end 71 of the upper edge 68 of the side window 52 is at the rearward end of the side window frame 50, as shown in FIG. 3. The configuration of the side window 52 and the channel 70 are well known to persons who are skilled in the art. The prior art side mirrors 22 having a housing 72 that supports a reflector 74, as shown with regard to prior art side mirror 22a in FIG. 2, that is configured to allow the driver 16 to see the driver side view 54 and the passenger side view 56 when he or she is sitting in the driver's seat 38 while operating the automobile 14 with his or her hands on and controlling the steering wheel 36. The housing 72 of a prior art side mirror 22 is attached to or integral with a mirror support member 76 that is attached to or supported by the body 24 of the automobile 14 or in an area adjacent the window post 48 using bolts, screws or other connectors. Persons who are skilled in the art are familiar with the use and configuration of prior art side mirrors 22 and side windows 52. For purposes of the present invention, the location where the prior art side mirror 22 is located is referred to as the prior art mounting position 78. As set forth in more detail below and shown in FIG. 2, in a preferred configuration of the system 12 of the present invention, the new side mirror apparatus 10 is mounted to the mounting position 78.

As shown in FIG. 3, the new apparatus 10 generally comprises a mirror frame 80 that is, in the preferred embodiments of the present invention, configured similar to a prior art windshield deflector and/or visor that are structured and arranged to be received between the forward edge 66 of the side window 52 and the channel 70 at the window post 48 and the upper edge 68 of the side window 52 and the channel 70 along the side window frame 50. More specifically, the new mirror frame 80 has a first or side section 82 that fits between the forward edge 66 of the side window 52 and the channel 70 at the window post 48 and an upper section 84 that fits between the upper edge 68 of the side window 52 and the channel 70 along the side window frame 50. Both the first/side section 82 and the second/upper section 84 of the mirror frame 80 has a contiguously formed window channel 86 that are configured to receive, respectively, the forward edge 66 of the side window 52 and the upper edge of the side window 52, as shown in FIG. 3.

As set forth in more detail below, the first/side section 82 of the mirror frame 80 is cooperatively structured and arranged with prior art mounting position 78, whether at the body 24 or side window 52 of the automobile 14, such that a portion of the first/side section 82 is mounted to the automobile 14 at the prior art mounting position 78 to secure the new side mirror apparatus 10 in place on the automobile 14. In a preferred configuration, the same bolts, screws or other connectors that secured the prior art side mirror 22 to the automobile 14 are also utilized to secure the first/side section 82 to the automobile 14. Likewise, the window channel 86 of the mirror frame 80 is sized and configured to receive the forward edge 66 and the upper edge 68 of the side window 52 in the same manner as prior art window reflectors and/or visors that are utilized for side windows 52 of an automobile 14. As will be readily appreciated by persons who are skilled in the art, the mirror frame 80 of the new apparatus 10 can be made out of a wide variety of materials or combination of materials. In some configurations, at least the second/upper section 84 of the mirror frame 80 is made out of the same cast acrylic material from which many prior art reflectors and/or visors are made and, if desired, be tinted to a reduce sunlight from affecting the driver 16 while he or she is driving the automobile 14.

As shown in FIGS. 4-5, the first/side section 82 of the mirror frame 80 has a first or lower end 88 that is positioned at the prior art mounting position 78 and a second or upper end 90 that is attached to or integral with the second/upper section 84 of the mirror frame 80. The first/side section 82 defines a housing 92 from at or near the first/lower end 88 thereof to, in a preferred embodiment, at or towards second upper end 90 thereof, as best shown in FIG. 5. In the preferred configurations, the forward end 94, outer side 96 and inner side 98 of the housing 92 is closed and the rearward end 100, which can be seen by the driver 16 when he or she is sitting in the driver's seat 38, is at least generally open to define an interior chamber 102 inside the housing 92. Preferably, the forward end 94, outer side 96 and inner side 98 housing 92 of the first/side section 82 of the mirror frame 80 is configured in the form of a prior art air deflector that will deflect air around the respective side 30/32 of the body 24 of the automobile 14 in an aerodynamically efficient manner when the automobile 14 is moving, particularly when moving at relatively high speed. In some embodiments, the inner side 98 of the housing 92 is the body 24 or another component (i.e., associated with the window post 48 and/or side window frame 50) of the automobile 14. As best shown in FIG. 5, the window channel 86 of the first/side section 82 of the mirror frame 80, which is dimensioned to receive the forward edge 66 of the side window 52, is position toward the inner side 98 of the housing 92 outside of the interior chamber 102 such that the forward edge 66 of the side window 52 is received inside the window channel 86 without interfering with the interior chamber 102 of the housing 92 when the apparatus 10 is positioned between the side window 52 and window post 48 of the automobile 14, as best shown in FIG. 3.

The inner side 98 of the housing 92 is configured to be positioned against the automobile 14 at the prior art mounting position 78 and connected to the automobile 14 using the same bolts, screws and/or other connectors which were utilized to secure the prior art side mirror 22, which was removed, in place on the automobile 14. The connecting of the inner side 98 of the housing 92 to the automobile 14, whether the body 24 or another component (such as positioned at the forward bottom edge of the side window frame 50), and the receiving of the forward edge 66 of the side window 52 into the portion of the window channel 86 associated with the first/side section 82 of the mirror frame 80 will secure the first/side section 82 to the automobile 14. As set forth in more detail below, the second/upper section 84 of the mirror frame 80 is secured in place by the upper edge 68 of the side window 52 being received into the portion of the window channel 86 associated with the second/upper section 84 to hold that section 84 in place between the upper edge 68 of the side window 52 and the side window frame 50, as shown in FIG. 3.

Inside the interior chamber 102 of the housing 92 are located one or more reflectors that are utilized by the driver 16 to see the driver side view 54 and passenger side view 56. In preferred embodiments, the interior chamber 102 has two or more reflectors that are able to be positioned therein in a manner which eliminates the blind spot 18 that are known to be so dangerous while driving the automobile 14, particularly in busy traffic where there is other vehicles 20 moving along the automobile 14 in lanes that are adjacent to the automobile 14. In one of the preferred embodiments, the new side view apparatus 10 has three reflectors, shown as a first deflector 104, a second deflector 106 and a third deflector 108, as shown in FIGS. 4-5. As best shown in FIG. 5, the first deflector 104 is the lowest deflector, being positioned toward the first/lower end 88 of the first/side section 82 and is the "primary" reflector that is, at least generally, in the same position as the relevant prior art side mirror 22. The second reflector 106 is positioned in the interior chamber 102 above the first reflector 104 toward the second/upper end 90 of the first/side section 82. The third reflector 108 is positioned in the interior chamber 102 above the second reflector 106 further toward the second/upper end 90 of the first/side section 82. As will be readily appreciated by persons skilled in the art, the three reflectors 104/106/108 are placed at different angles from each other so that the driver 16 will be able to place the reflectors 104/106/108 in a better viewing position to get a full field of view with regard to the driver side view 54 and the passenger side view 56 to be sure to see an object, such as another motor vehicle 20, that is alongside or approaching the automobile 14 which the driver 16 is driving (i.e., such as being in the blind spot 18).

Each of the reflectors 104/106/108 are connected to the inner wall 110 of the interior chamber 102 utilizing a mirror mounting mechanism 112 that mounts, separately, each of the reflectors 104/106/108 in position inside the housing 92 of the first/side section 82 of mirror frame 80. Each mirror mounting mechanism 112 is structured and arranged to allow the respective reflector 104/106/108 to pivot relative to the housing 92 to show a portion of the driver side view 54 or passenger side view 56, depending on which side of the automobile 14 the new side mirror apparatus 10 is located. Typically, the reflectors 104/106/108 inside the interior chamber 102 of the housing 92 are strategically positioned therein to provide at least somewhat overlapping views of the portions of the driver side view 54 or passenger side view 56. The mirror mounting mechanisms 112 for the reflectors 104/106/108 are also structured and arranged to fixedly secure the subject reflector 104/106/108 in place inside the housing 92, meaning the mirror mounting mechanism 112 for each reflector 104/106/108 is configured to hold the subject reflector 104/106/108 in its moved-to or adjusted position in a manner that will not allow the reflector 104/106/108 to move out of position during movement or other operation of the automobile 14.

In the preferred embodiments of the present invention, at least the first reflector 104 is operatively connected to the prior art mirror control system 114 of the automobile 14 that, typically, is configured to allow the driver 16 to engage the mirror mounting mechanism 112 thereof to change the angle of the first reflector 104 from the interior 34 of the automobile 14. More specifically, as will be readily appreciated by persons skilled in the art, the mirror control system 114 allows the driver 16 to change the angle of the first reflector 104 while sitting in the driver's seat 38 behind the steering wheel 36. The mirror control system 114 may be configured to allow electric or mechanical adjustment of the angle of the first reflector 104 from the interior 34 of the automobile 14. In certain embodiments, the mirror mounting mechanism 112 of the second reflector 106 and/or third reflector 108 may also be connected to the automobile's mirror control system 114 to allow adjustment of the angle of the second reflector 104 and/or the third reflector 106 by the driver 16 from the interior 34 of automobile 14. In the preferred embodiments of the present invention, however, the second reflector 104 and the third reflector 106 have a mirror mounting mechanism 112 that is configured for hand manual adjustment of the angle of these reflectors 104/106. The use and configuration of hand-manipulated mirror mounting mechanisms 112 are well known by persons who are skilled in the relevant art. As will be readily appreciated by such persons, the prior art hand-manipulated mirror mounting mechanisms 112 are structured and arranged to allow a person, typically the driver 16, to press against sides and edges of a reflector to change the tilt of the reflector and, therefore, the viewing angle of the reflector. Although these mirror mounting mechanisms 112 are configured to allow the person to easily adjust the angle of the reflector, once the reflector is moved by the person, the mirror mounting mechanism 112 securely holds the reflector in the moved-to position so the angle of the subject reflector is not altered by the movement of the automobile 14 during movement or other use thereof. The reflectors 104/106/108 may utilized virtually any type of mirror mounting mechanism 112 that allows the new side mirror apparatus 10 and system 12 to achieve the desired objectives of the present invention.

The reflectors 104/106/108 can be virtually any type of reflector that is or can be utilized as a reflector 74 in prior art side mirror 22. Typically, such reflectors 104/106/108 are a glass or glass-like mirror that suitably reflects back to the driver 16 the objects 20, including motor vehicles, in the driver side view 54 or passenger side view 56 so that the driver 16 of an automobile 14 may take action that is consistent with safe operation of the automobile 14. Likewise, the size and shape of a reflector 104/106/108 can be selected so as to fit inside the interior chamber 102 of the housing 92 and to be appropriate for the size, type, use or other factors associated with the automobile 14 with which the new side mirror apparatus 10 and system 12 will be utilized. Typically, but not necessarily, the lowermost first reflector 104 will be larger than the second reflector 106, which will be larger than the third reflector 108. The size and configuration of the first/side section 82 of the mirror frame 80 will need to take into consideration any laws or regulations that limit the extent of outward placement of objects from the sides 30/32 of the body 24 of an automobile 14. In addition, the size and configuration of the first/side section 82 should take into account practical considerations with regard to being able to safely drive, park or otherwise move the automobile 14.

As set forth above, at least a portion of the first/side section 82 of the mirror frame 80 is structured and arranged to extend along the window post 48 of the automobile 14 securely between the forward edge 66 of the side window 52 and the window post 48, as shown in FIG. 3. As also set forth above, the housing 92 having the first reflector 104 is placed at the prior art mounting position 78. In one configuration, the housing 92 for the first reflector 104 is positioned against the body 24 slightly in front of and below the window post 48 and the remainder of the first/side section 82 extends upward therefrom along the window post 48, as shown in FIG. 3. In another configuration, the housing 92 is positioned at a plate or other structure that is generally adjacent the window post 48 above the body 24 (i.e., just above the front doors 60) of the automobile 14. In either of these configurations, the first/side section 82 of the mirror frame 80 is configured substantially the same as prior art deflectors and visors that are placed in this same area of a side window 52. Specifically, as best shown in FIGS. 3-4, the first/side section 82 has a forward edge 116 that is sized and configured to snugly fit inside the channel 70 of the window post 48 and a rearward edge 118 that defines the window channel 86 which is sized and configured to snugly receive the forward edge 66 of the side window 52 (as was the channel 70 of the window post 48 before use of the new side view mirror apparatus 10) when the side window 52 is in its raised position 62, as shown in FIG. 3.

The second/upper section 84 of the mirror frame 80 is attached to or integral with, which is likely preferred, the first/side section 82 thereof and to extend along the side window frame 50 securely between the upper edge 68 of the side window 52 and the side window frame 50, as shown in FIG. 3. In the preferred embodiments, the second/upper section 84 of the mirror frame 80 is configured substantially the same as prior art deflectors and visors that are placed in this same area of the side windows 52. Specifically, as best shown in FIGS. 3-4, the second/upper section 84 has an top edge 120 that is sized and configured to snugly fit inside the channel 70 of the side window frame 50 and a bottom edge 122 that defines the window channel 86 of the second/upper section 84 which is sized and configured to snugly receive the upper edge 68 of the side window 52 (in the same manner the channel 70 of the side window frame 50) when the side window 52 is in its raised position 62, as shown in FIG. 3. The second/upper section 84 of the mirror frame 80 has a distal end 124 that, as shown in FIG. 4, extends rearward from the first/side section 82. In the embodiment shown in the figures, the second/upper section 84 extends along the entire upper edge 68 of the side window 52 such that the distal end 124 thereof is at or near the distal end 71 of the upper edge 68 of the side window 52, as shown in FIG. 3. As will be readily appreciated by persons who are skilled in the art, the second/upper section 84 can be of any length such that the distal end 124 thereof can be anywhere along the length of the upper edge 68 of the side window 52, even very near the first/side section 82 of the mirror frame 80 such that the length of the second/upper section 84 has a short length.

Figure 6:
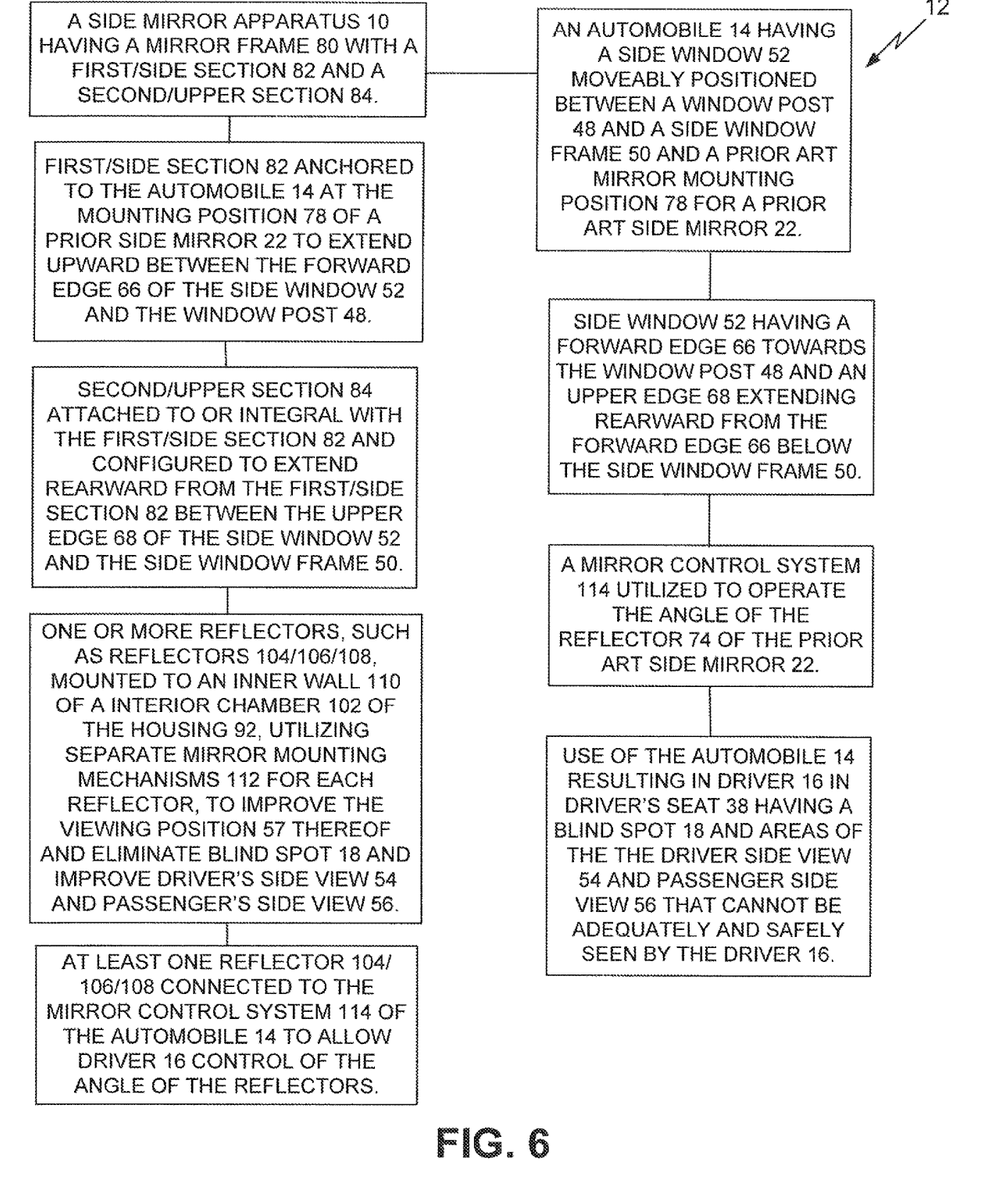
FIG. 6 is a chart summarizing the system of the present invention.

As shown in FIGS. 3 and 6, the side mirror system 12 of the present invention comprises the side mirror apparatus 10 that is described above and an automobile 14 having a side window 52 with a window post 48 at the forward edge 66 of the side window 52 and a side window frame 50 at an upper edge 68 of the side window 52. The side mirror apparatus 10 has a mirror frame 80 which is sized and configured such that the first/side section 82 thereof is anchored to the automobile 14 at the mounting position 78 of the prior art side mirror 22, which was removed to install the new side mirror apparatus 10, so as to extend upward between the forward edge 66 of the side window 52 and the window post 48 and a second/upper section 84 that is attached to or integral with the first/side section 82 so as to extend rearward therefrom between the upper edge 68 of the side window 52 and the side window frame 50, as shown in FIG. 3. The first/side section 82 has at least one reflector, such as the first reflector 104, second reflector 106 and third reflector 108 that are tilted at slightly different angles to improve the viewing positions 57 that allows the driver 16 to have a full view, or at least substantially full view, of the driver side view 54 or passenger side view 56 when he or she is in the driver's seat 48 so as to avoid visibility problems with any blind spot 18 and/or lack of being able to fully see the driver side view 54 and the passenger side view 56 that could result in damage to the automobile 14 and injury to the driver 16 and/or his or her passengers, such as may occur due to an object being in or approaching the blind spot 18, driver side view 54 and/or passenger side view 56. As set forth above, the reflectors 104/106/108 (in the embodiment where three reflectors are utilized) are mounted to an inner wall 110 of the interior chamber 102 of the housing 92 utilizing a separate mirror mounting mechanism 112 for each reflector that are configured in a manner which allows a person, such as the driver 16, to adjust the reflectors 104/106/108 to provide the best possible view of any adjacent or approaching object 20, such as another vehicle. The angle of the reflectors 104/106/108 can be adjusted to allow the driver 16 the best views possible. In a preferred configuration, the first reflector 104 connects to the same mirror control system 114 that was utilized to operate the removed prior art side mirror 22 to allow the driver 16 to adjust it as needed in the same manner as he or she did with the side mirror 22.

As will be readily appreciated by persons who are skilled in the art, a number of variations to the side mirror apparatus 10 and system 12 can be made to one or more of the components thereof. For instance, the rearward end 100 of the housing 92, which is open in the preferred embodiments, can be closed with a transparent material, such as acrylic or the like, that is selected to protect the reflectors 104/106/108, keep dirt and other debris out of the interior chamber 102 and allow the driver 16 to see the reflectors 104/106/108 when he or she is driving the automobile 14. In addition, the various components of the apparatus 10 and system 12 can be made out one or more materials that are selected for their functionality, appearance, durability and any other desirable feature. The first/side section 82 and the second/upper section 84 of the mirror frame 80 can be sized and configured in a wide variety of different manners as may be appropriate to best fit the automobile 14 or as may be desired to achieve a particular aesthetic benefit for the new side mirror apparatus 10.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. A side view mirror apparatus for an automobile having a side window received in a channel extending along a window post and a window frame of the automobile, with a forward edge of the side window being movably received into the channel of the window post and an upper edge of the side window being movably received into the channel of the window frame when said side window is in a raised position, said mirror apparatus comprising:
a mirror frame having a side section and an upper section attached to or integral with said side section, said side section having a forward edge that is sized and configured to be received in the channel in the window post and said upper section having a top edge sized and configured to be received in the channel in the window frame;
a window channel in each of said side section and said upper section of said mirror frame, said window channel of said side section sized and configured to receive the forward edge of the side window, said window channel of said upper section sized and configured to receive the upper edge of the side window; and
a first reflector movably disposed in an interior chamber of said mirror frame, said reflector structured and arranged to allow adjustments to the viewing position of said reflector so as to improve the ability of a driver of the automobile to see any objects in or approaching one or more of a blind spot, a driver side view and a passenger side view associated with the automobile.

2. The mirror apparatus of claim 1 further comprising a mirror mounting mechanism interconnecting said reflector and mirror frame, said mirror mounting mechanism being structured and arranged to allow fixable movement of said reflector relative to said mirror frame.

3. The mirror apparatus of claim 2, wherein said mirror mounting mechanism is operatively connected to a mirror control system of the automobile.

4. The mirror apparatus of claim 1, wherein said side section has the first reflector toward a lower end of the interior chamber and a second reflector in said interior chamber above said first reflector, each of said first reflector and said second reflector movably disposed in said interior chamber of said side section.

5. The mirror apparatus of claim 4, further comprising a third reflector in said interior chamber positioned above said second reflector, said third reflector being movably disposed in said interior chamber of said mirror frame.

6. The mirror apparatus of claim 5, wherein each of said first reflector, said second reflector and said third reflector are separately secured to said interior chamber with a mirror mounting mechanism, each of said mirror mounting mechanisms structured and arranged to allow said first reflector, said second reflector and said third reflector to pivot relative to said mirror frame.

7. The mirror apparatus of claim 6, wherein said mirror mounting mechanism of at least one of first reflector, said second reflector and said third reflector is operatively connected to a mirror control system of the automobile.

8. The mirror apparatus of claim 5, wherein said first reflector is larger than said second reflector and said second reflector is larger than said third reflector.

9. The mirror apparatus of claim 1, wherein said reflector is operatively connected to a mirror control system of the automobile.

10. The mirror apparatus of claim 1, wherein said mirror frame is connected to a mounting position associated with the automobile.

11. The mirror apparatus of claim 1, wherein a distal end of said upper section of said mirror frame extends to a distal end of the upper edge of the side window so as to extend the full length of said upper edge when said side window is in the raised position.

12. A side view mirror apparatus for an automobile having a side window received in a channel extending along a window post and a window frame of the automobile, with a forward edge of the side window being movably received into the channel of the window post and an upper edge of the side window being movably received into the channel of the window frame, said mirror apparatus comprising:
a mirror frame having a side section and an upper section attached to or integral with said side section, said side section having a forward edge that is sized and configured to be received in the channel in the window post and said upper section having a top edge sized and configured to be received in the channel in the window frame, said mirror frame connected to a mounting position associated with the automobile;
a window channel in each of said side section and said upper section of said mirror frame, said window channel of said side section sized and configured to receive the forward edge of the side window, said window channel of said upper section sized and configured to receive the upper edge of the side window;
a housing in the side section, said housing having a forward end, an outer side, an inner side and a rearward end defining an interior chamber in said housing;
a first reflector movably disposed in said housing, said first reflector positioned toward a lower end of said side section;
a second reflector movably disposed in said housing, said second reflector positioned above said first reflector, each of said first reflector and said second reflector being structured and arranged to allow adjustments to the viewing position of each of said first reflector and said second reflector so as to improve the ability of a driver of the automobile to see any objects in or approaching one or more of a blind spot, a driver side view and a passenger side view associated with the automobile.

13. The mirror apparatus of claim 12, wherein a distal end of said upper section of said mirror frame extends to a distal end of the upper edge of the side window so as to extend the full length of said upper edge when said side window is in a raised position.

14. The mirror apparatus of claim 12, wherein each of said first reflector and said second reflector are separately secured to said interior chamber with a mirror mounting mechanism associated with each one of said first reflector and said second reflector, each of said mirror mounting mechanisms structured and arranged to allow said first reflector and said second reflector to pivot relative to said housing.

15. The mirror apparatus of claim 14, wherein said mirror mounting mechanism of at least one of said first reflector and said second reflector is operatively connected to a mirror control system of the automobile.

16. The mirror apparatus of claim 14, further comprising a third reflector in said housing positioned above said second reflector, said third reflector being movably disposed in said interior chamber of said housing.

17. The mirror apparatus of claim 16, wherein each of said first reflector, said second reflector and said third reflector are separately secured to said interior chamber with a mirror mounting mechanism, each of said mirror mounting mechanisms structured and arranged to allow said first reflector, said second reflector and said third reflector to pivot relative to said housing.

18. A side view mirror system, comprising:
  an automobile having a mounting position at which an existing side mirror was attached to said automobile;
  a side window associated with said automobile;
  a channel extending along a window post and a window frame of said automobile when said side window is in a raised position, a forward edge of said side window being movably received into said channel associated with said window post, an upper edge of said side window being movably received into said channel associated with said window frame;
  a mirror apparatus having a mirror frame with a side section and an upper section, said upper section attached to or integral with said side section so as to extend rearwardly therefrom when said mirror apparatus is secured to said automobile, said side section having a forward edge that is sized and configured to be received in said channel in said window post and said upper section having a top edge that is sized and configured to be received in said channel in said window frame, said side section of said mirror frame connected to said mounting position of said automobile;
  a window channel in each of said side section and said upper section of said mirror frame, said window channel of said side section sized and configured to receive said forward edge of said side window, said window channel of said upper section sized and configured to receive said upper edge of said side window;
  a housing in said side section of said mirror frame, said housing having a forward end, an outer side, an inner side and a rearward end that define an interior chamber in said housing;
  a first reflector movably disposed in said housing, said first reflector positioned toward a lower end of said side section;
  a second reflector movably disposed in said housing above said first reflector; and
  a mirror mounting mechanism associated with each one of said first reflector and said second reflector so as to separately secure said first reflector and said second reflector to said interior chamber, each of said mirror mounting mechanisms structured and arranged to allow said first reflector and said second reflector to pivot separately relative to said housing to allow adjustments to be made to the viewing position of each of said first reflector and said second reflector so as to improve the ability of a driver of said automobile to see any objects in or approaching one or more of a blind spot, a driver side view and a passenger side view associated with said automobile.

19. The mirror apparatus of claim 18, further comprising a third reflector in said housing positioned above said second reflector, said third reflector having a mirror mounting mechanism associated therewith so as to be movably disposed in said interior chamber of said housing.

20. The mirror apparatus of claim 19, wherein said mirror mounting mechanism of at least one of said first reflector, said second reflector and said third reflector is operatively connected to a mirror control system of the automobile.

\* \* \* \* \*